(12) United States Patent
Fernandes Goncalves et al.

(10) Patent No.: US 10,873,245 B2
(45) Date of Patent: Dec. 22, 2020

(54) COLD PLATE FOR A LINEAR MOTOR

(71) Applicant: ETEL S.A., Môtiers (CH)

(72) Inventors: José Manuel Fernandes Goncalves, Colombier (CH); Sylwia Szczukiewicz, Lausanne (CH)

(73) Assignee: ETEL S.A., Môtiers (CH)

( * ) Notice: Subject to any disclaimer, the term of this patent is extended or adjusted under 35 U.S.C. 154(b) by 409 days.

(21) Appl. No.: 15/808,206

(22) Filed: Nov. 9, 2017

(65) Prior Publication Data

US 2018/0138785 A1    May 17, 2018

(30) Foreign Application Priority Data

Nov. 16, 2016 (EP) ..................... 16199009

(51) Int. Cl.
| | |
|---|---|
| *H02K 41/00* | (2006.01) |
| *H02K 9/22* | (2006.01) |
| *H02K 41/02* | (2006.01) |
| *H02K 5/20* | (2006.01) |
| *H02K 9/19* | (2006.01) |

(52) U.S. Cl.
CPC ................ *H02K 9/22* (2013.01); *H02K 5/20* (2013.01); *H02K 9/19* (2013.01); *H02K 41/02* (2013.01)

(58) Field of Classification Search
CPC .. H02K 7/1869; H02K 7/1876; H02K 7/1892; H02K 33/00; H02K 33/02; H02K 33/16; H02K 33/18; H02K 33/14; H02K 35/00; H02K 41/02; H02K 9/00; H02K 9/02; H02K 9/10; H02K 9/193; H02K 9/19; H02K 9/16; H02K 9/22; H02K 5/12; H02K 5/20; H02K 5/225; H02K 5/22; H02K 5/24; H02K 2209/00
USPC ...... 310/15–25, 12.01–12.27, 28–30, 36–37, 310/12.29; 318/400–422; 359/824; 381/400–422
See application file for complete search history.

(56) References Cited

U.S. PATENT DOCUMENTS

| | | | | |
|---|---|---|---|---|
| 5,138,292 A | * | 8/1992 | Forster | ...................... H01F 7/06 335/260 |
| 5,642,013 A | | 6/1997 | Wavre | |
| 5,864,187 A | | 1/1999 | Gonzalez | |
| 6,114,781 A | * | 9/2000 | Hazelton | ............. G03F 7/70758 310/12.06 |
| 6,664,665 B2 | * | 12/2003 | Hsiao | ..................... H02K 41/03 310/12.14 |

(Continued)

FOREIGN PATENT DOCUMENTS

| | | |
|---|---|---|
| WO | WO 03/005538 A1 | 1/2003 |
| WO | WO 2014/036812 A1 | 3/2014 |

*Primary Examiner* — Maged M Almawri
(74) *Attorney, Agent, or Firm* — Carter Deluca & Farrell LLP

(57) ABSTRACT

A cold plate for a linear motor includes a planar housing having a cooled surface for placement against a surface to be cooled, and first and second chambers arranged in the housing, which extend parallel to the cooled surface and are separated by a diaphragm. The housing has two half-shells and the diaphragm, which is disposed between the half-shells and is connected to the two half-shells. The first chamber, facing away from the cooled surface, is connected to a coolant inlet, and the second chamber, bounded by the cooled surface, is connected to a coolant outlet.

11 Claims, 2 Drawing Sheets

(56) References Cited

U.S. PATENT DOCUMENTS

| | | | |
|---|---|---|---|
| 6,707,195 B1* | 3/2004 | De Martino | H02K 5/136 310/88 |
| 6,731,026 B1* | 5/2004 | Kawaguchi | B23H 7/26 219/69.11 |
| 6,825,583 B2* | 11/2004 | Joung | H02K 41/03 310/12.29 |
| 7,841,385 B2* | 11/2010 | Campbell | H05K 7/20218 165/104.33 |
| 8,885,148 B2* | 11/2014 | Zordan | H02K 9/19 310/12.02 |
| 8,976,333 B2 | 3/2015 | Donders | |
| 9,325,223 B2* | 4/2016 | Shinohira | H02K 9/19 |
| 9,620,998 B2* | 4/2017 | Li | H02K 41/0356 |
| 2002/0163256 A1* | 11/2002 | Tajima | H02K 41/0356 310/12.29 |
| 2003/0141769 A1* | 7/2003 | Kubo | G03F 7/70758 310/12.06 |
| 2004/0070290 A1* | 4/2004 | Joung | H02K 5/20 310/52 |
| 2006/0175907 A1* | 8/2006 | Shikayama | H02K 41/031 310/12.25 |
| 2007/0252445 A1* | 11/2007 | Shinohira | H02K 41/03 310/12.23 |
| 2009/0315414 A1* | 12/2009 | Shikayama | H02K 41/03 310/12.29 |
| 2011/0181130 A1* | 7/2011 | Yoshida | H02K 41/031 310/12.29 |
| 2011/0317137 A1* | 12/2011 | Donders | G03F 7/70858 355/30 |
| 2012/0062866 A1* | 3/2012 | Binnard | H02K 9/22 355/72 |
| 2012/0170016 A1* | 7/2012 | Zordan | H02K 9/19 355/72 |
| 2014/0312718 A1* | 10/2014 | Li | H02K 41/0356 310/12.29 |
| 2015/0162812 A1* | 6/2015 | Da Conceicao Rosa | H02K 41/031 310/12.29 |
| 2016/0164392 A1* | 6/2016 | Chen | H02K 41/031 310/12.29 |
| 2019/0126773 A1* | 5/2019 | Chung | H05K 7/20927 |
| 2019/0273425 A1* | 9/2019 | Kuroda | H02K 5/04 |
| 2019/0305659 A1* | 10/2019 | Kitahara | H02K 33/16 |
| 2019/0312489 A1* | 10/2019 | Trolliet | H02K 41/03 |
| 2019/0326803 A1* | 10/2019 | Hasegawa | H02K 33/16 |

* cited by examiner

COLD PLATE FOR A LINEAR MOTOR

CROSS-REFERENCE TO RELATED APPLICATIONS

The present application claims priority to Application No. 16199009.8. filed in the European Patent Office on Nov. 16, 2016, which is expressly incorporated herein in its entirety by reference thereto.

FIELD OF THE INVENTION

The present invention relates to a cold plate for a linear motor and to a linear motor having such a cold plate. To increase the performance of a linear motor and to protect the environment from an excessive heat input, the primary part of a linear motor has to be cooled. Cold plates that are disposed in the vicinity of the coils of a primary part of the linear motor are suitable for this purpose.

BACKGROUND INFORMATION

U.S. Pat. No. 5,642,013 describes linear motors and how such drives can be constructed in order to avoid cogging torques or at least reduce such cogging torques to a significant extent. It proposes to provide cooling channels between the teeth of the iron core that are carrying coils for cooling these motors. However, such cooling channels reduce the space factor of the intermediate spaces of the teeth, and the maximum power of a motor cooled in this manner is lower than in a motor having a higher space factor.

U.S. Pat. No. 5,864,187 describes a linear motor that is cooled from the back side of the laminated stator core, that is to say, from the side that is located opposite from the teeth and coils. For this purpose, the iron core, which is encapsulated in epoxy resin, sits in an actively cooled frame made of metal, and cooling channels extend on the back side of the frame, i.e., on the side facing away from the teeth and coils of the iron core. In one exemplary embodiment, the inlet and outlet for the coolant are situated next to each other on the same end of the linear motor. A serpentine-type cooling channel travels to the end of the linear motor situated opposite and back again from there, so that the cooling effect is evenly distributed across the entire length of the motor. However, such serpentine-type cooling channels are quite complex in their production due to the frequent changes in direction during the milling.

U.S. Pat. No. 8,976,333 describes a cold plate for a linear motor. This cold plate utilizes the fact that a coolant flowing with turbulence is better able to absorb heat than a coolant featuring a laminar flow. For this purpose, the cold plate provides a system of three chambers, which are situated on top of one another and are connected to one another via openings and tubes, through which the coolant flows. One chamber is in contact with the surface to be cooled, and the other chambers are used for the supply and discharge of the coolant. However, the design of this cold plate is quite complex and is thus expensive.

SUMMARY

Example embodiments of the present invention provide a cold plate for a linear motor that has a particularly simple configuration while providing excellent heat dissipation at the same time.

According to an example embodiment of the present invention, a cold plate for a linear motor includes: a planar housing having a cooled surface to be placed against a surface to be cooled; and first and second chambers, which extend parallel to the cooled surface and are separated by a diaphragm, are disposed inside the housing. The housing has two half-shells and the diaphragm that is disposed between the half-shells and connected to the two half-shells. The first chamber facing away from the cooled surface is connected to a coolant inlet, and the second chamber, which is delimited by the cooled surface, is connected to a coolant outlet.

The diaphragm has a plurality of nozzles through which the coolant is able to flow from the first chamber into the second chamber. The nozzles are arranged such that the cooled surface is cooled with the aid of a turbulent flow of the coolant. In the process, each nozzle generates a coolant jet that impinges upon the cooled surface. Despite the especially simple configuration of the cold plate, excellent cooling of a primary part of a linear motor is able to take place in this manner. Furthermore, since fresh coolant is flowing through the first chamber, which faces away from the primary part and on which a machine part to be moved is mounted, for example, the first chamber, and thus the machine part, remains cool for the most part. The machine is therefore well shielded from a heat input from the direction of the linear motor, and problems with a thermal expansion of machine parts are able to be avoided.

Further features and aspects of example embodiments of the present invention are described in more detail below with reference to the appended Figures.

DETAILED DESCRIPTION

A cold plate K according to an example embodiment of the present invention is illustrated in different views in FIGS. 1 to 4. In addition to the exploded views of cold plate K in FIGS. 1 and 2, FIGS. 3 and 4 illustrate cold plate K mounted on a primary part P of a linear motor.

Cold plate K includes a planar housing G, and coolant flows through the housing interior and carrying away heat absorbed by cold plate K in the process. Cold plate K is intended to be mounted on the back side of a primary part P of a linear motor, i.e., on the side facing away from the air gap between primary part P and the secondary part of the linear motor. Cold plate K is thus arranged between primary part P and a device or an application that is operated by the linear motor. The largest possible portion of the heat generated in the coils of primary part P is dissipated with the aid of cold plate K.

Figure 1:
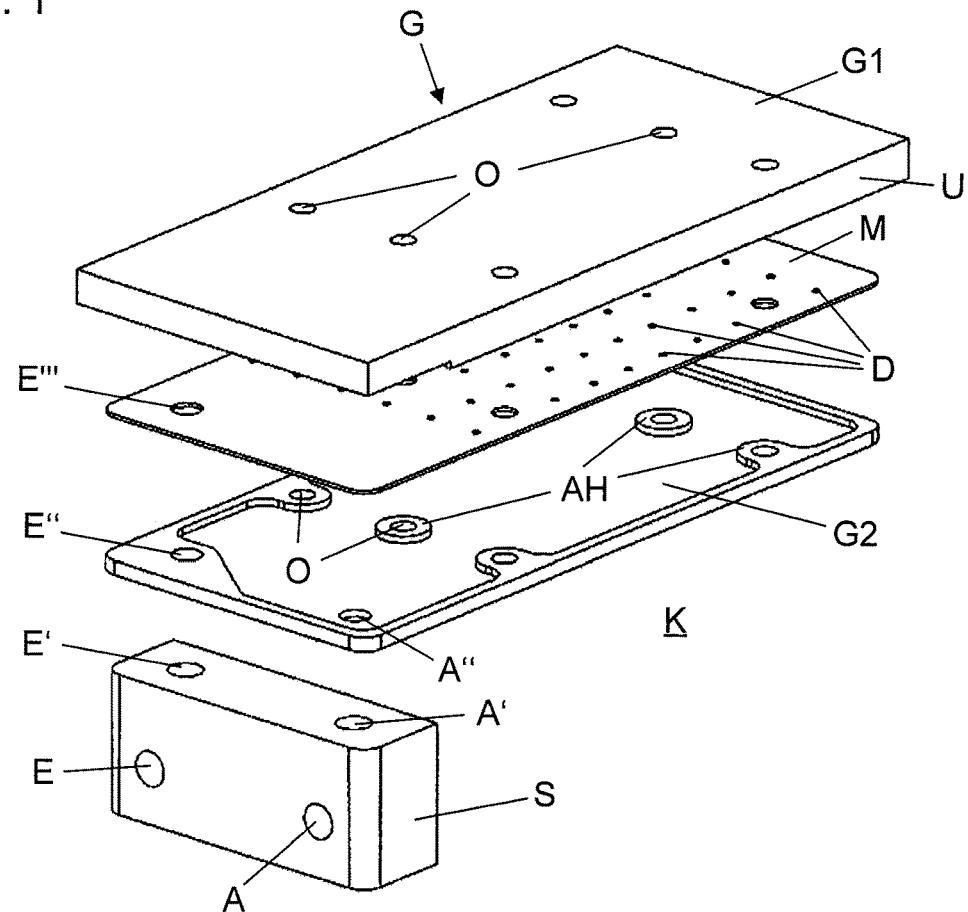
FIG. 1 is an exploded view of a cold plate according to an example embodiment of the present invention.
Figure 2:
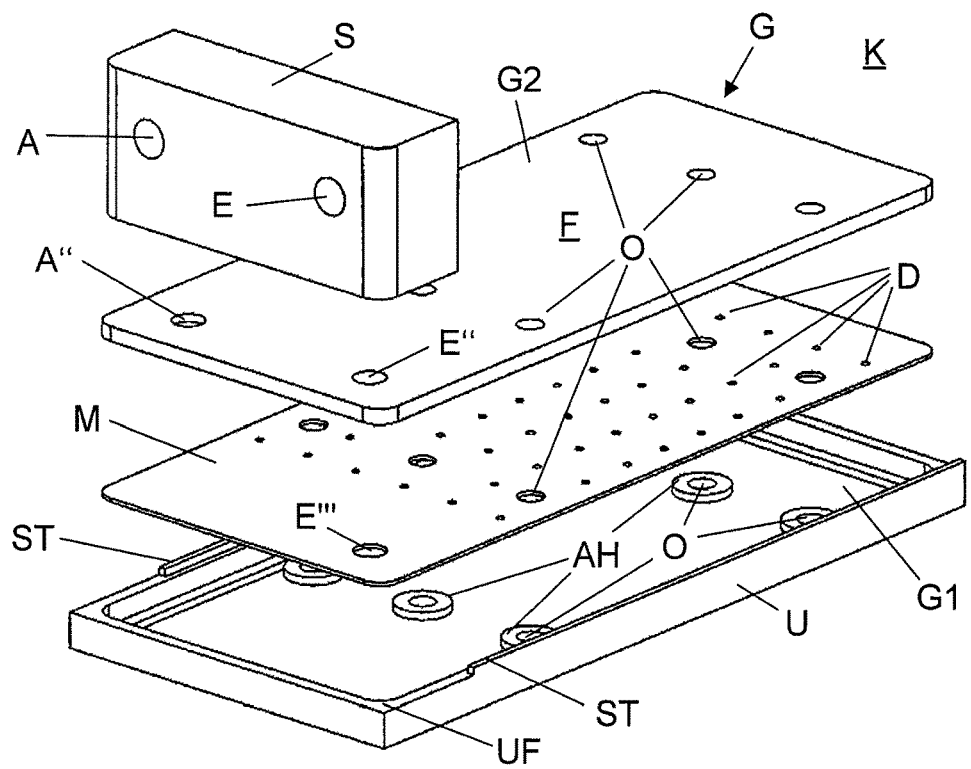
FIG. 2 is another exploded view of the cold plate.
Figure 3:
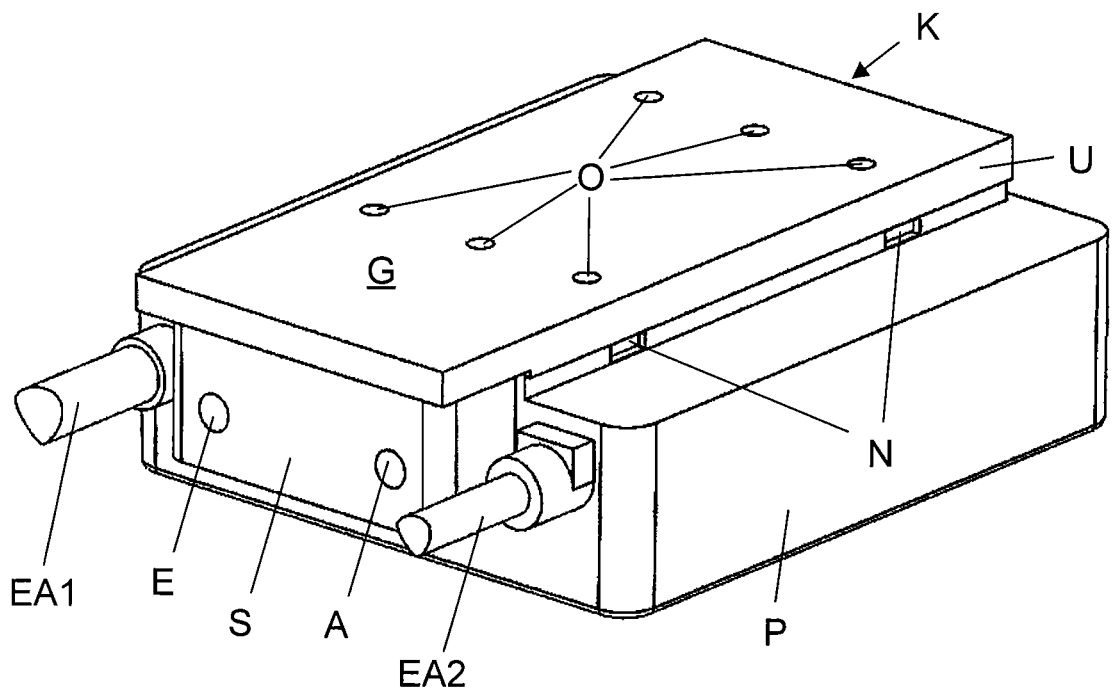
FIG. 3 is a perspective view of the cold plate in the fully mounted state on a primary part of a linear motor.

As can be clearly seen especially in FIGS. 1 and 2, planar housing G of cold plate K includes two half-shells G1, G2, with a diaphragm M that is arranged therebetween and subdivides housing G into two chambers K1, K2. The inner structure of the two half-shells G1, G2 is illustrated in the two exploded views from different perspectives.

First half-shell G1 faces away from primary part P of the linear motor to be cooled. An application is placed on this side of cold plate K, such as a machine part to be moved. A coolant inlet E, which is described in greater detail below, supplies first chamber K1 with fresh coolant, so that first half-shell G1 will substantially assume the temperature of the fresh coolant. An input of heat from primary part P to the respective application is able to be avoided in this manner. Stated differently, the interface between primary part P, which heats up during the operation, and a customer application is thermally especially well insulated due to cold plate K.

Via its planar partitioning wall, which is also referred to as cooled surface F in the following text, second half-shell G2 rests against primary part P of the linear motor in order to cool it. Cooled surface F may completely cover the surface of primary part P to be cooled. For example, this may be the back side of the laminated stator core, onto which the coils of the linear motor are wound, inasmuch as this laminated stator core dissipates the waste heat of the coil to cold plate K in a satisfactory manner.

The two half-shells G1 and G2 and the diaphragm are made from, for example, aluminum, stainless steel, copper, brass, titanium, etc., and may obtain their inner structure by a milling process, for instance. Nozzles D and other orifices in diaphragm M are able to be milled, drilled, produced with the aid of an etching process, etc. The two half-shells G1, G2 and diaphragm M are connected to one another by, for example, laser welding, soldering, diffusion bonding, etc. The connection is particularly easy to achieve with the aid of a flat soldering foil, which is situated between the components.

After the soldering operation in a soldering furnace, the individual contact areas soldered to one another are sealed so that no seals are required in the production of cold plate K.

After half-shells G1, G2 and diaphragm M arranged therebetween have been joined, the two chambers K1 and K2 are interconnected solely via nozzles D in diaphragm M.

Nozzles D together with an appropriately selected pressure (for example, approximately 3 to 6 bar, given a pressure drop of approximately 1 to 3 bar at the diaphragm) in first chamber K1 ensure that coolant jets emerge from nozzles D in second chamber K2 and impinge upon cooled surface F. This creates a turbulent flow of the coolant, whereby the heat is dissipated from cooled surface F in a clearly more optimal manner than by a laminar flow. Nozzles D may be arranged such that more strongly heated regions are cooled more heavily by providing a greater density of nozzles D in this region than in other regions. The coolant leaves second chamber K2 through a coolant outlet A.

Housing G or second half-shell G2 is soldered to a connecting piece S. This connecting piece S makes it possible to shift coolant inlet E and coolant outlet A (which initially lie at a right angle to planar housing G), tilted by 90 degrees, to an end face of primary part P, i.e., a location where electrical terminals EA1, EA2 of primary part P are normally also routed to the outside parallel to the plane of planar housing G of cold plate K. Connecting piece S is provided with bores B for this purpose, one in each case being illustrated in the cross-sectional view of FIG. 4. At coolant inlet E and at coolant outlet A, the coolant flows parallel to the plane of planar housing G, is rerouted by 90 degrees in connecting piece S, and then enters housing G or emerges from it at a right angle.

The right angle formed by planar housing G and connecting piece S is also well suited as a stop or a mounting appliance when cold plate K is mounted on primary part P because, with the exception of a lateral shift of housing G, all degrees of freedom of cold plate K relative to primary part P are already specified due to the angle.

The path E->E'->E''->E''' of the coolant into first chamber K1 can be traced with reference to FIGS. 1 and 2. E and E' are both arranged in connecting piece S and are connected to each other by bores B. E'' is a bore through second half-shell G2, and E''' is a bore in diaphragm M corresponding thereto. The coolant then reaches second chamber K2 via nozzles D. The path A''->A'->A of the coolant out of the second chamber leads via a bore A'' in second half-shell G2 and via A' and A in connecting piece S.

First half-shell G1 has a circumferential border U, which encloses second half-shell G2 on the side. Border U also has a contact surface UF, via which planar housing G rests against primary part P. Cooled surface F may be slightly recessed in relation to contact surface UF, so that it does not contact primary part P in the installed state. The gap between second housing shell G2 and primary part P that is created in this manner may be filled with a heat-conducting paste in order to thermally couple cooled surface F with primary part P.

Because of border U together with contact surface UF of first half-shell G1, height h of cold plate K to be taken into account is defined exclusively by the distance between contact surface UF facing primary part P and the side of first half-shell G1 facing away from primary part P. The tolerance or production variance of height h is thus defined by the processing tolerance of only a single processing step in the production of first half-shell G1 and may therefore be minimized. A solution in which height h would be defined also by dimensions of diaphragm M and/or second half-shell G2, for example, as well as by the joining process between these components would result in a clearly greater production variance of this height h. Due to the dependency of height h on only a single production tolerance, the dimension of the air gap between primary part P and the secondary part of the linear motor is likewise subject to a lower production variance inasmuch as the air gap is a direct function of height h of housing G.

As an alternative, if a lateral border that encloses first half-shell G1 is provided on second half-shell G2, then it is likewise possible to achieve a height h perpendicular to the plane of planar housing G that depends only on the dimension of the half-shell including the border.

For the mounting of machine elements, primary part P has suitable bores or T-shaped grooves N on its back side facing housing G. Housing G or half-shells G1, G2, and diaphragm M have corresponding assembly openings O, through which screws are able to be screwed into primary part P. The machine element, cold plate K, and primary part P are fixedly connected to one another. Mounting orifices O are surrounded by spacers AH in the interior of chambers K1, K2. These spacers AH absorb the forces that arise during the assembly of the linear motor, so that the housing will not be compressed. In addition, spacers AH rest against diaphragm M across their surface and are connected to the diaphragm, so that no coolant is able to escape from chambers K1, K2 through mounting orifices O. An expansion of housing G is also able to be prevented by spacers AH, which are connected to diaphragm M on both sides. Spacers AH are created in an uncomplicated manner if islands or regions that are connected to the outer border of chambers K1, K2 are left behind when cleaning out the pockets that form chambers K1, K2, as illustrated in FIGS. 1 and 2.

Figure 4:
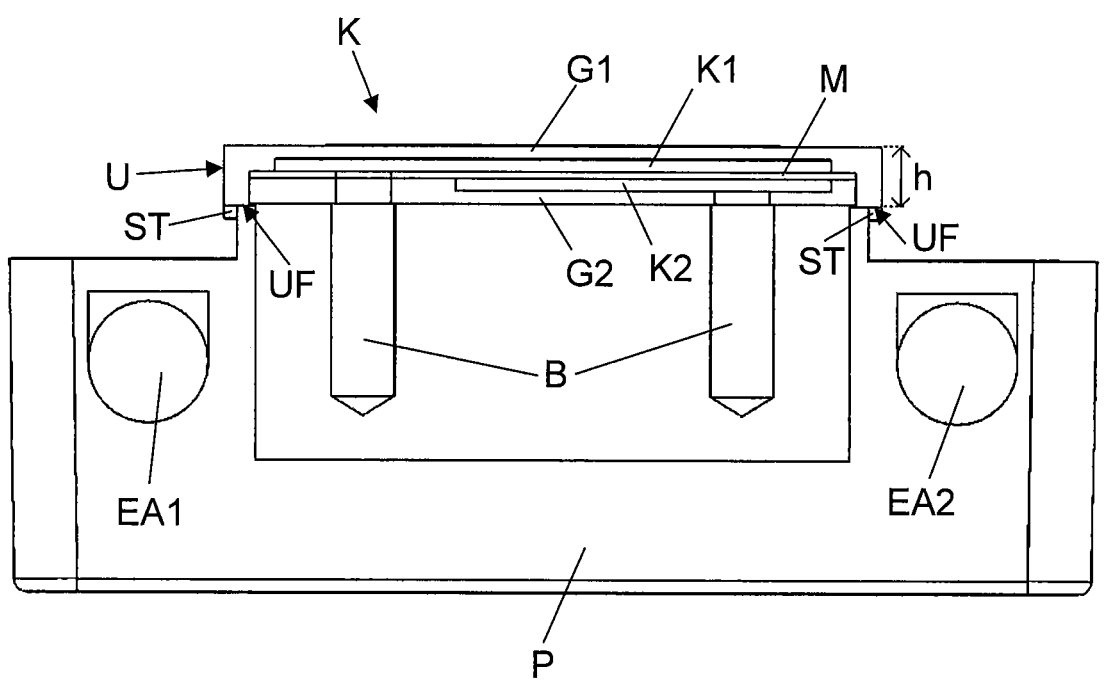
FIG. 4 is a cross-sectional view through a connecting piece of the cold plate.

Also illustrated in FIGS. 2 and 4 are lateral webs ST on first half-shell G1. These lateral webs ST project laterally beyond contact surfaces UF, and beyond primary part P in the assembled state, meaning that they are of no consequence for height h of housing G to be taken into account in connection with the air gap. However, lateral webs ST form additional lateral locating surfaces between cold plate K and primary part P, so that the mounting of cold plate K on primary part P becomes easier in that the lateral shift of cold plate K relative to primary part P is blocked as well, in addition to the above-described stop at the right angle between connecting piece S and housing G.

In comparison with conventional cold plates featuring a laminar flow, cold plate K described herein provides much better cooling power due to the turbulent flow in its interior. However, when compared to conventional cold plates featuring a turbulent flow, cold plate K has a much simpler configuration and is therefore able to be produced in a considerably more economical manner. Due to a few constructive details, cold plate K is also particularly suitable for use on primary part P of a linear motor.

What is claimed is:

1. A cold plate for a linear motor, comprising:
    a planar housing including:
        two half-shells; and
        a diaphragm arranged between and connected to the half-shells;
    wherein the housing includes a cooled surface adapted to be thermally coupled with a surface to be cooled, first and second chambers being provided in the housing, the first and second chambers extending parallel to the cooled surface and being separated by the diaphragm;
    wherein the first chamber faces away from the cooled surface and is connected to a coolant inlet, and the second chamber is bounded by the cooled surface and is connected to a coolant outlet;
    wherein the diaphragm includes a plurality of nozzles; and.
    wherein the nozzles are adapted to generate coolant jets to cool the cooled surface with the aid of a turbulent flow.

2. The cold plate according to claim 1, wherein the housing is connected to a connecting piece that includes the coolant inlet and the coolant outlet.

3. The cold plate according to claim 2, wherein the connecting piece includes bores adapted to divert the coolant by 90 degrees, the coolant inlet and the coolant outlet being arranged parallel to a plane of the planar housing.

4. The cold plate according to claim 1, wherein one of the two half-shells includes a border that encloses the other of the two half-shells on a side of the other of the two half-shells, so that a height of the housing perpendicular to a plane of the housing is defined solely by the half-shell that includes the border.

5. The cold plate according to claim 4, wherein a first half-shell has the border that encloses a second half-shell, the border having a contact surface that projects with respect to the cooled surface and via which the housing rests against the surface to be cooled, so that the height of the housing perpendicular to the surface to be cooled is defined solely by a distance between the contact surface and an opposite side of the first half-shell.

6. A linear motor, comprising a cold plate according to claim 1.

7. The linear motor according to claim 6, wherein the cooled surface of the housing is thermally coupled with a back side of a primary part of the linear motor facing away from an air gap of the linear motor.

8. The linear motor according to claim 6, wherein a gap between the cooled surface and a surface of a primary part of the linear motor to be cooled is provided by a contact surface projecting from one of the half-shells and is filled with a thermally-conductive paste.

9. The linear motor according to claim 6, wherein the housing is connected to a connecting piece that includes the coolant inlet and the coolant outlet and that rests against an end face of a primary part of the linear motor.

10. The linear motor according to claim 6, wherein the cooled surface of the housing completely covers a surface of a primary part of the linear motor to be cooled.

11. A cold plate for a linear motor, comprising:
    a planar housing including:
        two half-shells; and
        a diaphragm arranged between and connected to the half-shells;
    wherein the housing includes a cooled surface adapted to be thermally coupled with a surface to be cooled, first and second chambers being provided in the housing, the first and second chambers extending parallel to the cooled surface and being separated by the diaphragm;
    wherein the first chamber faces away from the cooled surface and is connected to a coolant inlet, and the second chamber is bounded by the cooled surface and is connected to a coolant outlet;
    wherein one of the two half-shells includes a border that encloses the other of the two half-shells on a side of the other of the two half-shells, so that a height of the housing perpendicular to a plane of the housing is defined solely by the half-shell that includes the border; and
    wherein a first half-shell has the border that encloses a second half-shell, the border having a contact surface that projects with respect to the cooled surface and via which the housing rests against the surface to be cooled, so that the height of the housing perpendicular to the surface to be cooled is defined solely by a distance between the contact surface and an opposite side of the first half-shell.

* * * * *